US012628051B2

(12) United States Patent
Lyu et al.

(10) Patent No.: US 12,628,051 B2
(45) Date of Patent: May 12, 2026

(54) METHOD FOR SATELLITE HANDOVER BETWEEN NON-TERRESTRIAL NETWORKS, TERMINAL DEVICE, AND NETWORK DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/052,970

(22) Filed: Feb. 13, 2025

(65) Prior Publication Data

US 2025/0184835 A1 Jun. 5, 2025

Related U.S. Application Data

(63) Continuation of application No. PCT/CN2023/113814, filed on Aug. 18, 2023.

(51) Int. Cl.
*H04W 36/00* (2009.01)
*H04B 7/185* (2006.01)

(52) U.S. Cl.
CPC .... *H04W 36/0055* (2013.01); *H04B 7/18513* (2013.01)

(58) Field of Classification Search
CPC .................. H04W 36/0055; H04B 7/18513
See application file for complete search history.

(56) References Cited

U.S. PATENT DOCUMENTS

| | | | | |
|---|---|---|---|---|
| 2012/0184278 A1* | 7/2012 | Chin | .................... | H04W 36/249 |
| | | | | 455/438 |
| 2022/0322477 A1* | 10/2022 | Sengupta | ............ | H04W 56/001 |
| 2023/0133633 A1* | 5/2023 | Park | ................. | H04W 56/0015 |
| | | | | 370/331 |
| 2024/0187938 A1* | 6/2024 | Cui | .................... | H04W 56/0015 |
| 2024/0334281 A1* | 10/2024 | Khoshkholgh Dashtaki | .............. | |
| | | | | H04W 36/083 |
| 2024/0381195 A1* | 11/2024 | Leng | .................... | H04W 72/231 |
| 2025/0016647 A1* | 1/2025 | Xu | ......................... | H04W 72/11 |
| 2025/0038897 A1* | 1/2025 | Khoshkholgh Dashtaki | .............. | |
| | | | | H04L 1/1887 |

FOREIGN PATENT DOCUMENTS

| | | |
|---|---|---|
| CN | 103428782 A | 12/2013 |
| CN | 113498619 A | 10/2021 |

OTHER PUBLICATIONS

International Search Report and Written Opinion in International Appln. No. PCT/CN2023/113814, mailed on Jan. 23, 2024, 13 pages (with machine translation).

* cited by examiner

*Primary Examiner* — Fred A Casca
(74) *Attorney, Agent, or Firm* — Fish & Richardson P.C.

(57) ABSTRACT

The present application provides a method for satellite handover between non-terrestrial networks, a terminal device, and a network device. One example method includes: receiving a first handover command, where the first handover command instructs a terminal device to perform satellite handover from a coverage of a first satellite network to a coverage of a second satellite network; and performing first synchronization with the second satellite network based on a first parameter before the satellite handover is performed, where the first parameter is determined based on information in the first handover command.

20 Claims, 5 Drawing Sheets

Receive a first handover command     S510

Perform first synchronization with a second satellite network based on a first parameter before satellite handover     S520

| Terminal device | First satellite network | Second satellite network |
|---|---|---|

S810: First handover command

S820: Start a first timer

S830: First synchronization

S840: Start a timer T304

S850: Start a timer T430

S860: Initial uplink transmission

S870: Acknowledgment that handover is completed

S880: Stop the timer T304

Terminal device 900

Receiving unit 910

Execution unit 920

Network device 1000

Transmitting unit 1010

1

METHOD FOR SATELLITE HANDOVER BETWEEN NON-TERRESTRIAL NETWORKS, TERMINAL DEVICE, AND NETWORK DEVICE

CROSS-REFERENCE TO RELATED APPLICATIONS

This application is a continuation of International Application No. PCT/CN2023/113814, filed on Aug. 18, 2023, the disclosures of which is hereby incorporated by reference in its entirety.

TECHNICAL FIELD

The present application relates to the field of communications technologies, and more specifically, to a method for satellite handover between non-terrestrial networks, a terminal device, and a network device.

BACKGROUND

Random access channel-less (random access channel-less, RACH-less) handover is introduced, to improve user experience and shorten handover delay of a terminal device from a source cell to a target cell.

However, a delay of propagation between a terminal device and a network device is relatively long in a non-terrestrial network (non-terrestrial network, NTN) system. When performing RACH-less satellite handover in an NTN system, a terminal device may be incapable of using an uplink resource configured by a target satellite network, resulting in handover access failure.

SUMMARY

The present application provides a method for satellite handover between non-terrestrial networks, a terminal device, and a network device. Various aspects of embodiments of the present application are described below.

According to a first aspect, a method for satellite handover between non-terrestrial networks is provided, including: receiving a first handover command, where the first handover command is used to instruct a terminal device to perform satellite handover from a coverage of a first satellite network to a coverage of a second satellite network; and performing first synchronization with the second satellite network based on first parameters before the satellite handover is performed, where at least some of the first parameters are determined based on information in the first handover command.

According to a second aspect, a method for satellite handover between non-terrestrial networks is provided, including: transmitting a first handover command to a terminal device, where the first handover command is used to instruct the terminal device to perform satellite handover from a coverage of a first satellite network to a coverage of a second satellite network; where the first handover command is used to determine at least some of first parameters; and the first parameter is used by the terminal device for performing first synchronization with the second satellite network before the satellite handover is performed.

According to a third aspect, a method for satellite handover between non-terrestrial networks is provided, including: receiving a handover request transmitted by a first satellite network; and transmitting a handover response message to the first satellite network, where the handover response message is used by the first satellite network for determining a first handover command; the first handover command is used to instruct a terminal device to perform satellite handover from a coverage of the first satellite network to a coverage of a second satellite network; the first handover command is used to determine at least some of first parameters; and the first parameter is used by the terminal device for performing first synchronization with the second satellite network before the satellite handover is performed.

According to a fourth aspect, a terminal device is provided. The terminal device includes: a receiving unit, receiving a first handover command, where the first handover command is used to instruct a terminal device to perform satellite handover from a coverage of a first satellite network to a coverage of a second satellite network; and an execution unit, performing first synchronization with the second satellite network based on first parameters before the satellite handover is performed, where at least some of the first parameters are determined based on information in the first handover command.

According to a fifth aspect, a network device is provided. The network device corresponds to a first satellite network. The network device includes: a transmitting unit, transmitting a first handover command to a terminal device, where the first handover command is used to instruct the terminal device to perform satellite handover from a coverage of the first satellite network to a coverage of a second satellite network; the first handover command is used to determine at least some of first parameters; and the first parameter is used by the terminal device for performing first synchronization with the second satellite network before the satellite handover is performed.

According to a sixth aspect, a network device is provided. The network device corresponds to a second satellite network. The network device includes: a receiving unit, receiving a handover request transmitted by a first satellite network; and a transmitting unit, transmitting a handover response message to the first satellite network, where the handover response message is used by the first satellite network for determining a first handover command; the first handover command is used to instruct a terminal device to perform satellite handover from a coverage of the first satellite network to a coverage of the second satellite network; the first handover command is used to determine at least some of first parameters; and the first parameter is used by the terminal device for performing first synchronization with the second satellite network before the satellite handover is performed.

According to a seventh aspect, a communications apparatus is provided. The apparatus includes a memory and a processor, where the memory is configured to store a program; and the processor is configured to invoke the program from the memory, to execute the method according to any one of the first aspect to the third aspect.

According to an eighth aspect, an apparatus is provided. The apparatus includes a processor configured to invoke the program from the memory, to execute the method according to any one of the first aspect to the third aspect.

According to a ninth aspect, a chip is provided, including a processor configured to invoke a program from a memory, to cause a device installed with the chip to execute the method according to any one of the first aspect to the third aspect.

According to a tenth aspect, a computer-readable storage medium is provided, storing a program, where the program causes a computer to execute the method according to any one of the first aspect to the third aspect.

According to an eleventh aspect, a computer program product is provided, including a program, where the program causes a computer to execute the method according to any one of the first aspect to the third aspect.

According to a twelfth aspect, a computer program is provided. The computer program causes a computer to execute the method according to any one of the first aspect to the third aspect.

According to embodiments of the present application, after receiving a first handover command, a terminal device performs first synchronization with a second satellite network before the satellite handover is performed. First synchronization is performed based on handover-related time information in the first handover command. Based on first synchronization, the terminal device can be synchronized with the second satellite network before the satellite handover is performed, thereby preventing missing an uplink resource configured by the second satellite network for the terminal device, and thus being beneficial to improve an access success rate of the terminal device.

DETAILED DESCRIPTION OF THE EMBODIMENTS

Figure 1:
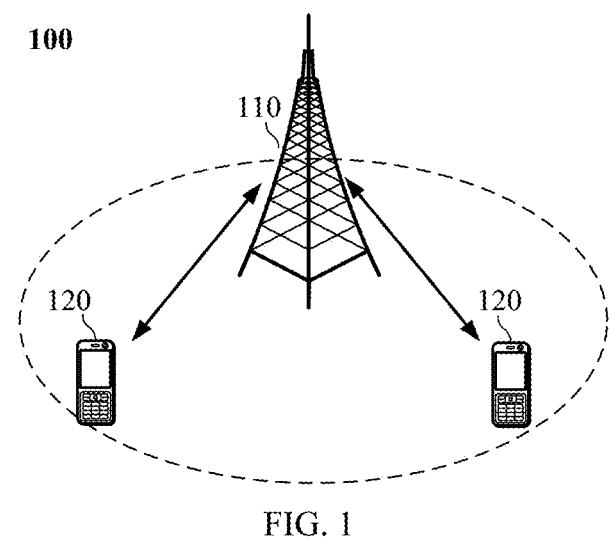
FIG. 1 is a wireless communications system to which an embodiment of the present application is applied.

The following describes the technical solutions in embodiments of the present application with reference to the accompanying drawings in embodiments of the present application. Apparently, the described embodiments are some rather than all of embodiments of the present application. For embodiments of the present application, all other embodiments obtained by a person of ordinary skill in the art without creative efforts fall within the protection scope of the present application.

Embodiments of the present application may be applied to various communications systems. For example, embodiments of the present application may be applied to a global system for mobile communications (global system of mobile communication, GSM), a code-division multiple access (code division multiple access, CDMA) system, a wideband code-division multiple access (wideband code division multiple access, WCDMA) system, a general packet radio service (general packet radio service, GPRS), a long term evolution (long term evolution, LTE) system, an advanced long term evolution (advanced long term evolution, LTE-A) system, a new radio (new radio, NR) system, an evolution system of an NR system, an LTE-based access to unlicensed spectrum (LTE-based access to unlicensed spectrum, LTE-U) system, an NR-based access to unlicensed spectrum (NR-based access to unlicensed spectrum, NR-U) system, an NTN system, a universal mobile communications system (universal mobile telecommunication system, UMTS), a wireless local area network (wireless local area networks, WLAN), wireless fidelity (wireless fidelity, Wii), and a 5th generation (5th-generation, 5G) communications system. Embodiments of the present application may be further applied to another communications system, such as a future communications system. The future communications system may be, for example, a 6th-generation (6th-generation, 6G) mobile communications system, or a satellite (satellite) communications system.

Conventional communications systems support a limited quantity of connections and are easy to implement. However, with the development of communications technologies, a communications system may support not only conventional cellular communication but also one or more other types of communication. For example, the communications system may support one or more types of the following communication: device-to-device (device to device, D2D) communication, machine-to-machine (machine to machine, M2M) communication, machine type communication (machine type communication, MTC), enhanced MTC (enhanced MTC, eMTC), vehicle-to-vehicle (vehicle to vehicle, V2V) communication, vehicle-to-everything (vehicle to everything, V2X) communication, and the like. Embodiments of the present application may also be applied to a communications system that supports the foregoing communication manners.

The communications system in embodiments of the present application may be applied to a carrier aggregation (carrier aggregation, CA) scenario, a dual connectivity (dual connectivity, DC) scenario, or a standalone (standalone, SA) networking scenario.

The communications system in embodiments of the present application may be applied to an unlicensed spectrum. The unlicensed spectrum may also be considered as a shared spectrum. Alternatively, the communications system in embodiments of the present application may be applied to a licensed spectrum. The licensed spectrum may also be considered as a dedicated spectrum.

Embodiments of the present application may be applied to NTN systems. For example, the NTN system may include a 4G-based NTN system, an NR-based NTN system, an internet of things (internet of things, IoT)-based NTN system, and a narrow band-internet of things (narrow band internet of things, NB-IoT)-based NTN system.

The communications system may include one or more terminal devices. The terminal device in embodiments of the present application may also be referred to as user equipment (user equipment, UE), an access terminal, a subscriber unit, a subscriber station, a mobile site, a mobile station (mobile station, MS), a mobile terminal (mobile Terminal, MT), a remote station, a remote terminal, a mobile device, a user terminal, a terminal, a wireless communications device, a user agent, a user apparatus, or the like.

In some embodiments, the terminal device may be a station (STATION, ST) in a WLAN. In some embodiments, the terminal device may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device or another processing device connected to a wireless modem, a vehicle-mounted device, a wearable device, a terminal device in a next-generation communications system (such as an NR system) or a terminal device in a future evolved public land mobile network (public land mobile network, PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone (mobile phone), a tablet computer (Pad), a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, or a satellite.

In addition to the terminal device, the communications system may further include one or more network devices. The network device in embodiments of the present application may be a device for communicating with the terminal device. The network device may also be referred to as an access network device or a wireless access network device. The network device may be, for example, a base station. The network device in embodiments of the present application may be a radio access network (radio access network, RAN) node (or device) that connects the terminal device to a wireless network. The base station may broadly cover various names in the following, or may be interchangeable with the following names, for example: a NodeB (NodeB), an evolved NodeB (evolved NodeB, enby), a next generation NodeB (next generation NodeB, gNB), a relay station, an access point, a transmitting and receiving point (transmitting and receiving point, TRP), a transmitting point (transmitting point, TP), a master MeNB, a secondary Sen, a multi-standard radio (MSR) node, a home base station, a network controller, an access node, a wireless node, an access point (access point, AP), a transmission node, a transceiver node, a base band unit (base band unit, BBU), a remote radio unit (remote radio unit, RRU), an active antenna unit (active antenna unit, AAU), a remote radio head (remote radio head, RRH), a central unit (central unit, CU), a distributed unit (distributed unit, DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X, and M2M communications, a network-side device in a 6G network, a device that functions as a base station in a future communications system, or the like. The base station may support networks with a same access technology or different access technologies. A specific technology and a specific device used by the network device are not limited in embodiments of the present application.

The base station may be a fixed station or a mobile station. For example, a helicopter or an unmanned aerial vehicle may be configured to serve as a mobile base station, and one or more cells may move depending on a location of the mobile base station. In another example, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

As an example, rather than limitation, in embodiments of the present application, the network device may have a mobile feature, for example, the network device may be a movable device. In some embodiments of the present application, the network device may be a satellite or a balloon station. In some embodiments of the present application, the network device may alternatively be a base station disposed in a location such as land or water.

In embodiments of the present application, the network device may provide a service for a cell, and the terminal device communicates with the network device by using a transmission resource (for example, a frequency resource or a spectrum resource) used by the cell. The cell may be a cell corresponding to the network device (for example, a base station). The cell may belong to a macro base station or belong to a base station corresponding to a small cell (small cell). The small cell herein may include: a metro cell (metro cell), a micro cell (micro cell), a Pico cell (pica cell), a femtohm cell (femto cell), or the like. These small cells have a small coverage and low transmit power, and are suitable for providing a high-rate data transmission service.

For example, FIG. 1 is a schematic diagram of an architecture of a communications system according to an embodiment of the present application. As shown in FIG. 1, the communications system 100 may include a network device 110, and the network device 110 may be a device that communicates with a terminal device 120 (or referred to as a communications terminal or a terminal). The network device 110 may provide communication coverage for a specific geographic area, and may communicate with a terminal device within the coverage.

FIG. 1 illustrates one network device and two terminal devices. In some embodiments of the present application, the communications system 100 may include a plurality of network devices, and another quantity of terminal devices may be included within a coverage of each network device. This is not limited in embodiments of the present application.

Figure 2:
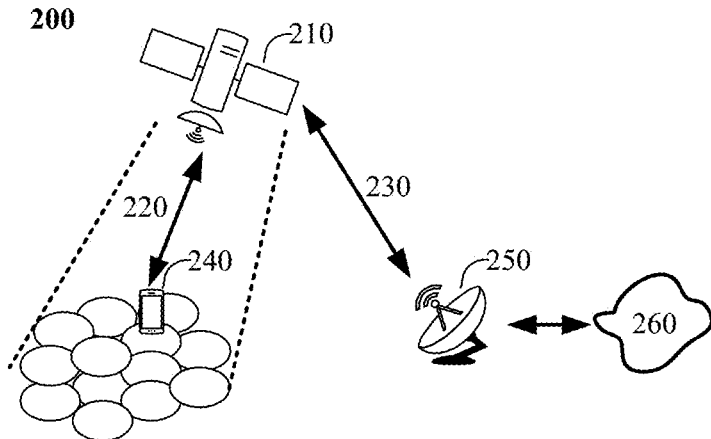
FIG. 2 is an NTN system to which an embodiment of the present application is applied.

For example, FIG. 2 is a schematic diagram of an architecture of the foregoing NTN system. The NTN system 200 shown in FIG. 2 uses a satellite 210 as an air platform. As shown in FIG. 2, a satellite radio access network includes the satellite 210, a service link 220, a feeder link 230, a terminal device 240, a gateway (gateway, GW) 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The earth-based gateway 250 connects the satellite 210 to a base station or a core network, depending on selection of an architecture.

The NTN architecture shown in FIG. 2 is a bent pipe transponder architecture. In this architecture, the base station is located on the earth behind the gateway 250, and the satellite 210 functions as a relay. The satellite 210 operates as a repeater for forwarding a signal of the feeder link 230 to the service link 220, or forwarding a signal of the service link 220 to the feeder link 230. In other words, the satellite 210 does not have a function of a base station, and communication between the terminal device 240 and the base station in the network 260 needs to be implemented by forwarding via the satellite 210.

Figure 3:
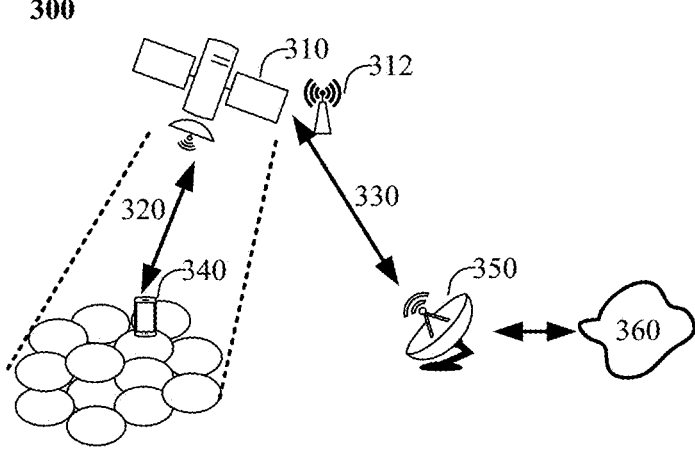
FIG. 3 is another NTN system to which an embodiment of the present application is applied.

For example, FIG. 3 is a schematic diagram of another architecture of the NTN system. As shown in FIG. 3, a satellite radio access network 300 includes a satellite 310, a service link 320, a feeder link 330, a terminal device 340, a gateway 350, and a network 360. FIG. 3 differs from FIG. 2 in that a base station 312 is provided on the satellite 310, and the network 360 behind the gateway 350 includes only a core network.

The NTN architecture shown in FIG. 3 is a regenerative transponder architecture. In this architecture, the satellite 310 carries the base station 312, and may be directly connected to an earth-based core network by using a link. The satellite 310 has a function of a base station, and the terminal device 340 may directly communicate with the satellite 310. Therefore, the satellite 310 may be referred to as a network device.

The communications system in the architecture shown in FIG. 2 and FIG. 3 may include a plurality of network devices, and another quantity of terminal devices may be included within coverage of each network device, which is not limited in embodiments of the present application.

In embodiments of the present application, the communications system shown in FIG. 1 to FIG. 3 may further include another network entity such as a mobility management entity (mobility management entity, MME) or an access and mobility management function (access and mobility management function, AMF), which is not limited in embodiments of the present application.

It should be understood that a device having a communication function in a network/system in embodiments of the present application may be referred to as a communications device. The communications system 100 shown in FIG. 1 is used as an example. The communications device may include a network device 110 and a terminal device 120 that have a communications function. The network device 110 and the terminal device 120 may be specific devices described above. Details are not described herein again. The communications device may further include another device in the communications system 100, for example, another network entity such as a network controller or a mobility management entity, which is not limited in embodiments of the present application.

For ease of understanding, some related technical knowledge related to embodiments of the present application is introduced first. The following related technologies, as optional solutions, may be randomly combined with the technical solutions of embodiments of the present application, all of which fall within the protection scope of embodiments of the present application. Embodiments of the present application include at least part of the following content.

NTN System

With the development of communications technologies, a communications system (for example, 5G) will integrate a satellite and a terrestrial network infrastructure. For example, 5G standards enables an NTN, including a satellite segment, to become a part of recognized 3rd generation partnership project (3rd generation partnership project, 3GPP) 5G connection infrastructure.

An NTN is a network or a network segment that uses a radio frequency (radio frequency, RF) resource on a satellite or an unmanned aerial system (unmanned aerial system, UAS) platform. A satellite is used as an example. Communications satellites are classified into low earth orbit (low earth orbit, LEO) satellites, medium earth orbit (medium earth orbit, MEO) satellites, geostationary earth orbit (geostationary earth orbit, GEO) satellites, high elliptical orbit (high elliptical orbit, HEO) satellites, and the like depending on different orbital altitudes. An LEO is an earth-centered orbit with an altitude of 2,000 km or less, or at least 11.25 periods per day, and an eccentricity being less than 0.25. Most artificial objects in outer space are located on the LEO. The LEO satellites operate around the earth at a high speed (mobility), on a predictable or definite orbit.

Satellites with different orbital altitudes have different orbital periods.

The LEO has a typical height ranging from 250 km to 1,500 km, and an orbital period ranging from 90 minutes to 120 minutes.

An MEO has a typical height ranging from 5,000 km to 25,000 km, and an orbital period ranging from 3 hours to 15 hours.

A GEO has a height of about 35,786 km and an orbital period of 24 hours.

It may be learned from FIG. 2 and FIG. 3 in which a satellite is used as an example, a typical scenario of accessing an NTN system by a terminal device involves an NTN transparent payload (payload) or an NTN regenerative payload. The bent pipe transponder architecture shown in FIG. 2 corresponds to the NTN transparent payload, and the regenerative transponder architecture shown in FIG. 3 corresponds to the NTN regenerative payload.

In an NTN system, a delay of propagation between a terminal device and a network device mainly depends on a height of a satellite-borne or airborne platform and a type of a payload in an NTN. A delay of propagation between a terminal device and a network device in an NTN system is much longer than that in a terrestrial network (terrestrial network, TN). For example, in a cellular network used in traditional NR, propagation delay of a ground mobile system is generally less than 1 millisecond; and propagation delay of NTN systems ranges from a few milliseconds to hundreds of milliseconds.

NTN Satellite Handover

In an NTN system, a terminal device performs satellite handover from a source NTN satellite (NTN1) to a target NTN satellite (NTN2). In a handover process, the terminal device generally starts two timers to enhance a timing relationship. The two timers are a timer T304 and a timer T430.

The terminal device starts the timer T304 when satellite handover is started. In the handover process, once the timer T304 expires, the terminal device initiates a radio resource control (radio resource control, RRC) connection re-establishment (RRCconnection re-establishment) process to a target NTN cell.

The terminal device starts the timer T430, to perform downlink (downlink, DL) and uplink (uplink, UL) synchronization with the NTN2. It may be learned from the foregoing description that the source satellite NTN1 and a terminal device on the earth move relatively, resulting in assistance information (NTN-config) of the source satellite NTN1 involves a problem of effectiveness. The timer T430 is configured to ensure that the terminal device can continuously obtain valid assistance information of the source satellite NTN1. For example, the timer T430 may control the terminal device to obtain valid always assistance information in a system information block (system information block, SIB) 19, thereby ensuring that the assistance information of the source NTN1 obtained by the terminal device before completion of handover maintains valid.

The assistance information of the source satellite NTN1 is, for example, satellite ephemeris and common timing advance (timing advance, TA) parameters (satellite ephemeris and common TA parameters). For the NTN1, a network side may broadcast ephemeris information and a common TA (common TA) parameter. For example, the SIB19 includes satellite assistance information for NTN access. Before connecting to the NTN2, the terminal device has a valid global navigation satellite system (global navigation satellite system, GNSS) location, satellite ephemeris information, and a common TA.

When performing random access to a target cell, the terminal device determines the common TA and a specific TA to a satellite corresponding to the target cell. The terminal device may establish synchronization with the target cell based on the determined TA values and transmit an unlink channel to complete satellite handover.

Due to high-speed movement of a satellite, a TA from the terminal device to a satellite base station changes rapidly. When a satellite performs a uniform circular motion around the earth on an orbit that is 1,200 km from the ground, a change of a relative location caused by a low-speed movement of the terminal device may be ignored compared with the fast-moving satellite.

Because changes of a delay drift and a Doppler shift that are caused by a motion of the satellite may be accurately calculated based on a location of the satellite and a direction and speed of the motion, a change of the TA may be estimated. However, in a transmission process of a physical uplink shared channel (physical uplink shared channel, PUSCH) that supports a demodulation reference signal (demodulation reference signal, DMRS) bundling event, a TA can be updated only at a boundary of a time domain window (time domain window, TDW). For example, in an interval of an actual time domain window (actual time domain window, A-TDW), the terminal device is allowed to update the common TA and a specific TA of the terminal device in an A-TDW of each DMRS bundling window. For an NTN, capabilities of maintaining phase continuity and power consistency further depends on a terminal device that is configured to perform autonomous TA adjustment and frequency adjustment.

When the terminal device is in a connected state (connected mode), TA update and frequency pre-compensation (frequency pre-compensation) are performed continuously. The terminal device may be configured to report (report) a TA in the connected state. An event-triggered TA report (TA report, TAR) is also supported in the connected state. In some embodiments, a TA reporting process may be controlled based on the following two parameters: OffsetThresholdTA and timingAdvanceSR. A TAR is triggered in the following three scenarios: a MAC layer receives an indication that an RRC layer is to perform the TAR; when offsetThresholdTA is configured by the RRC layer, the terminal device has not reported any TA value to a current serving cell; a difference between information about a current TA and information about a TA reported last time is equal to or greater than offsetThresholdTA (in a case that the parameter is configured). Therefore, in a handover process, the RRC layer notifies the MAC layer of the indication that the TAR is to be performed. An MAC protocol data unit (protocol data unit, PDU) can contain at most a MAC CE of only one TAR. The MAC CE of the TAR should be generated based on a latest TA value that is estimated by the terminal device before the MAC PDU is packaged.

NTN TA Synchronization Mechanism

In some communications systems (for example, an NR system), an important feature of uplink transmission is that different terminal devices are orthogonally multiple-address in time and frequency, that is, uplink transmission of different terminal devices in a same cell does not interfere with each other. To ensure orthogonality of uplink transmission and avoid intra-cell interference, a network device requires that signals of different terminal devices having different frequency resources reach the network device at substantially aligned times.

To ensure time synchronization on a network device side, different terminal devices have their own uplink TAs. An uplink clock and a downlink clock on the network device side are the same, but there is an offset between an uplink clock and a downlink clock on a terminal device side. The network device may control, by appropriately controlling an offset (offset) of each terminal device, times at which uplink signals from different terminal devices reach the network device.

It may be learned from the foregoing description that propagation delays of DL communication and UL communication in an NTN are longer than those in a terrestrial network. To adapt to a relatively long propagation delay of an NTN, a timing relationship in transmission is enhanced by using a common TA and two scheduling offsets ($K_{offset}$ and $K_{mac}$).

The common TA is an offset configured in a system, and corresponds to a round-trip time (round-trip time, RTT) between a reference point (reference point RP) and an NTN load. $K_{offset}$ is a configured scheduling offset, and is generally greater than or equal to a sum of a service link RTT and the common TA. $K_{mac}$ is a configured offset, and is generally greater than or equal to an RTT between the reference point and the network device.

For ease of understanding, a plurality of parameters that are in an NTN system and related to a TA mechanism and a timing relationship are briefly described below with reference to FIG. 4. A communications system 400 shown in FIG. 4 includes a satellite 410, a terminal device 420, a reference point 430, and a gateway 440. An RTT 402 is generated between the satellite 410 and the terminal device 420. An RTT 403 is generated between the satellite 410 and the gateway 440.

In some embodiments, the reference point 430 may be an uplink time synchronization reference point. The uplink time synchronization reference point may be a point at which a DL and an UL perform frame alignment based on given offsets of a band, subcarrier spacing, and/or the like.

Figures 4, 5:
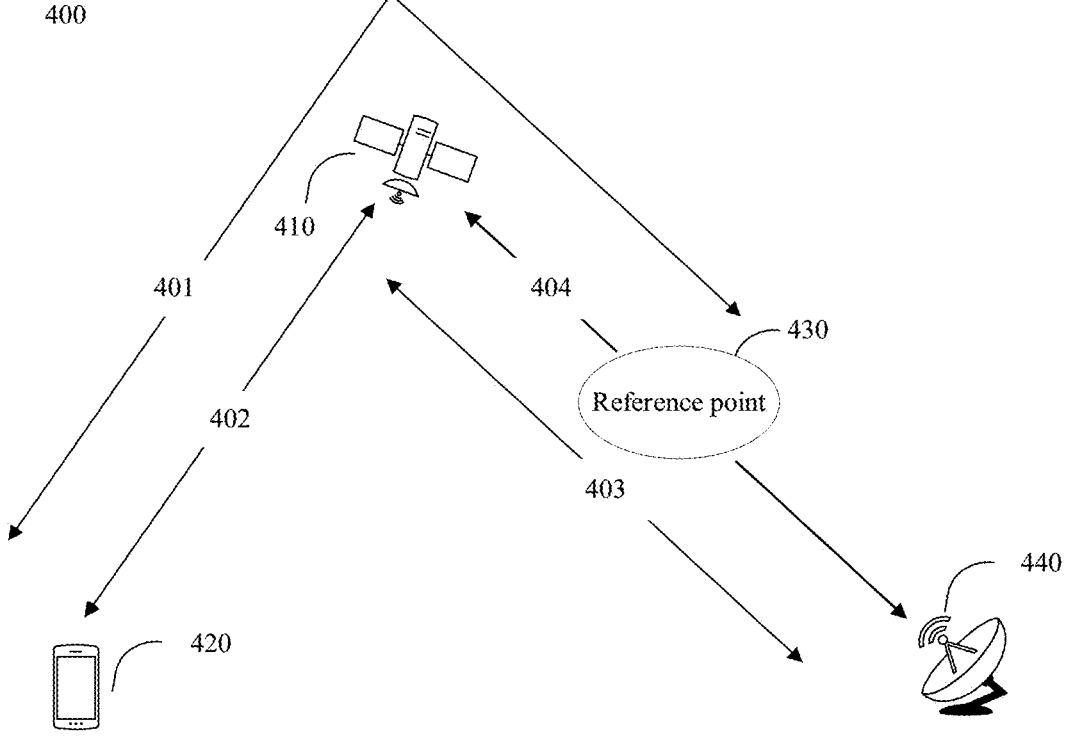
FIG. 4 is a schematic diagram of a TA configuration to which an embodiment of the present application is applicable.
FIG. 5 is a schematic flowchart of an NTN satellite handover method according to an embodiment of the present application.

In FIG. 4, an RTT 404 between the satellite 410 and the reference point 430 corresponds to a common TA. The common TA is a network-controlled TA that is common to all terminal devices in an NTN cell (non-terrestrial cell). The common TA may include any timing offset that is determined to be necessary by a network. In some examples, a familiar common TA may be determined by a network device corresponding to a cell or by another network device, to pre-compensate for a delay of a feeder link between the satellite and the network device or the gateway.

A value of the common TA may be determined based on a unidirectional propagation delay $\text{Delay}_{common}(t)$, to pre-compensate for a delay of bidirectional propagation between the uplink time synchronization reference point and a serving satellite (serving satellite). $\text{Delay}_{common}(t)$ is determined as follows:

$$\text{Delay}_{common}(t) =$$

$$\frac{TA_{Common}}{2} + \frac{TA_{CommonDrift}}{2} \times (t - t_{epoch}) + \frac{TA_{CommonDriftVariant}}{2} \times (t - t_{epoch})^2;$$

where $TA_{common}$, $TA_{commonDrift}$, and $TA_{commonDriftVariation}$ are respectively provided by information elements TACommon, TACommonDrift, and TACommonDrift Variation that are configured by an RRC layer; $t_{epoch}$ is an epoch time corresponding to TACommon, TACommonDrift, and TACommonDrift Variation; and $\text{Delay}_{common}(t)$ may be obtained by dividing a distance between the serving satellite and the uplink time synchronization reference point at a time t by the speed of light. In a case that TACommon, TACommonDrift, and TACommonDrift Variation are not configured by the RRC layer, the value of the common TA is 0.

Reference is made to FIG. 4 again. An RTT 401 between the terminal device 420 and the reference point 430 corresponds to the scheduling offset $K_{offset}$. As a configured scheduling offset, $K_{offset}$ may be used to resolve a problem of a timing relationship between scheduling and transmission of various uplink communication. In some scenarios, $K_{offset}$ may be used to compensate for a propagation delay in an NTN. $K_{offset}$ may also be referred to as a scheduling time offset or a timing offset.

In some embodiments, $K_{offset}$ may be set by a network device (for example, a base station).

In some embodiments, $K_{offset}$ may be cell-specific, UE-specific, or beam (beam)-specific. For example, each of beams in a same satellite and/or a same NTN cell may be provided with a corresponding value of $K_{offset}$.

$K_{offset}$ may be set as a beam-level or cell-level parameter. For example, values of $K_{offset}$ for different NTNs may be different. For another example, a value of $K_{offset}$ is determined based on an actual scenario. In some scenarios, a cell-specific $K_{offset}$ value of the NTN cell may be calculated at least partially based on a length of a feeder link between the base station or gateway and the satellite and a maximum possible distance from the terminal device.

The propagation delay in the NTN system and related configuration parameters are described above with reference to FIG. 4. For a terminal device in an NTN service area, at a instant T1, an actual TA value $T_{TA}$ corresponding to the terminal device may be determined according to the following formula:

$$T_{TA} = \left(N_{TA} + N_{TA,offset} + N_{TA,adj}^{common} + N_{TA,adj}^{UE}\right)T_c,$$

where $T_c$ denotes a specified time granularity; $N_{TA}$ denotes a TA value indicated in a TA command from the base station; $N_{TA,\ offset}$ denotes a fixed offset value associated with a band and/or subcarrier spacing;

$$N_{TA,adj}^{common}$$

denotes a common TA; and $$N_{TA,adj}^{UE}$$

represents a UE-specific TA (UE-specific TA).

$$N_{TA,adj}^{UE}$$

may be estimated by the terminal device itself to pre-compensate for a delay of a service link between the terminal device and the satellite. In some embodiments, $$N_{TA,adj}^{UE}$$

may be 0 (for example, for a non-terrestrial base station). In some embodiments, the terminal device may use a higher layer ephemeris (ephemeris) parameter (if any) of a serving satellite, and determine $$N_{TA,adj}^{UE}$$

based on a location where the serving satellite is used and its own location of the terminal device. For example, $$N_{TA,adj}^{UE}$$

may be determined based on the location of the terminal device and an ephemeris-related parameter of the serving satellite configured by the RRC layer. When no ephemeris information (ephemerisInfo) is configured by the RRC layer, $$N_{TA,adj}^{UE} = 0.$$

In a case that an RRC layer ephemeris parameter of the serving satellite is configured, the terminal device may pre-compensate for a bidirectional transmission delay on a service link based on $$N_{TA,adj}^{UE}.$$

NTA may be defined in a media access control control element (media access control control element, MAC CE), and is defined as 0 for physical random access channel (physical random access channel, PRACH) transmission.

In some embodiments, the base station may include indications of synchronization parameters (ephemeris and a common TA), a scheduling timing offset (for example, $K_{offset}$), and an RTT (for example, $K_{mac}$) between a reference point and the base station in a system information block. The base station may transmit a PUSCH at a specific frequency (for example, about once every few seconds).

RACH-less Handover (Handover, HO)

When a source cell, a target cell, and a terminal device are synchronized, a RACH-less handover solution may be introduced to shorten a handover delay and improve user experience. In a synchronous network, it may be considered that subframe boundaries between the source cell and the target cell are aligned. Therefore, the terminal device may perform handover from the source cell to the target cell at a time agreed upon by the three parties, without a random access procedure any more. For example, when the source cell, the target cell, and the terminal device are synchronized, the terminal device may perform handover from the source cell to the target cell at a system frame number (system frame number, SFN) agreed upon by the three parties without random access.

Because no random access procedure is performed, it is necessary to ensure that the source cell and the target cell are completely synchronized in an entire handover process of RACH-less handover. In an NTN system, both handover between satellites having a same feeder link and handover between satellites having different feeder links may be RACH-less handover in an NTN. The satellites with the same feeder link have a same gateway or network device (for example, gNB).

One of main purposes of a RACH procedure in a handover process is to obtain a TA of a target cell. In a case that there is a RACH during handover, the terminal device may obtain the TA of the target cell in a RACH process. In a case that there is no RACH procedure, when the source cell and the target cell are synchronized, the terminal device may obtain the TA of the target cell without an explicit TA command.

Another purpose of the RACH procedure in the handover process is to obtain uplink licensed transmission. In a case that there is no RACH procedure in a target cell, it is necessary to allocate an uplink grant in the target cell. In some embodiments, initial UL transmission in RACH-less handover supports a pre-allocated grant in a RACH-less handover command. In other words, the target cell may be pre-allocated based on an uplink grant (UL-grant) in the handover command. The pre-allocated uplink grant may remain valid for a period of time from an instant at which the terminal device is synchronized with the target cell. For example, a delay of propagation between the terminal device and the network device is relatively short when RACH-less handover is performed in an NR terrestrial network. Based on information about the delay of propagation between the terminal device and the network device, the target cell may appropriately configure, in the handover command, a time domain location of an uplink resource, thereby being beneficial to transmit an RRCReconfigurationComplete message (namely, a handover complete message) when the terminal device accesses the target cell.

However, the delay of propagation between the terminal device and the satellite in the NTN is relatively long, and a propagation delay of some of air interfaces through which the terminal device correctly receives a handover command is relatively long, resulting in that the terminal device may miss a configured uplink resource in a process of accessing the target cell, and thus resulting in a handover access failure.

For example, in the above-described PUSCH transmission that supports DMRS bundling, a TA can be updated only at a TDW boundary. In a handover scenario, because the terminal device never communicates with the target cell before handover, the target cell may be incapable of accurately obtaining a TA value of the terminal device. In a case that a TA determined by the target cell is less than a real TA value of the terminal device, an offset value indicated by downlink control information (downlink control information, DCI) may be less than the real TA value of the terminal device when a target base station schedules an uplink. The target base station schedules an uplink resource based on an unreal TA value, which may result in that the terminal device cannot use an uplink pre-configured resource when a physical downlink control channel (physical downlink control channel, PDCCH) is received. For example, the uplink resource has been missed by the terminal device, resulting in an access failure.

For another example, when the terminal device performs RACH-less handover and in a case that a deviation occurs for pre-compensation performed on a bidirectional transmission delay on a service link by the terminal device based on $$N_{TA,adj}^{UE},$$

an uplink and a downlink of a TA are out of synchronization. In a case that the uplink and the downlink are out of synchronization and when the terminal device is handed over to the target NTN2, there is no available pre-configured or dynamically configured resources, resulting in a handover failure.

For another example, when RACH-less handover is implemented in an NTN, after a measurement report of a terminal is received by the source NTN1, the source NTN1 selects (hands over) the target cell and transmits a RACH-less handover request message to the target NTN2. After receiving the handover request message, the target NTN2 pre-allocates a resource, and may further include a $K_{offset}$ parameter of the target NTN, a common TA, and other time parameters related to the target NTN2. Because there is no RACH preamble transmission and no response messages in a RACH-less process, a network (implicitly or explicitly) indicates that a TA in the target cell is the same as that in the source cell. However, TAs of the terminal device in the target cell and the source cell are unnecessary to be the same, and thus a time adjustment value of the terminal device may be wrong in the target cell, resulting in a handover failure.

In summary, when RACH-less handover is introduced in an NTN scenario, how to ensure a success rate of handover access of the terminal device has become a problem to be resolved.

It should be noted that the schematic scenario, that handover failure is caused by an error between the TA value specified by the target network and an actual value of the TA when RACH-less handover is introduced into an NTN system, is described above. Embodiments of the present application may be applied to any handover type of scenario in which a propagation delay is relatively long and a target network cannot determine an actual TA value via random access.

In view of this, an embodiment of the present application provides a method for satellite handover between non-terrestrial networks (NTN). According to this method, a terminal device performs first synchronization based on configuration information of a second satellite network before satellite handover, so that the terminal device can utilize timely an uplink resource configured by the second satellite network, and synchronization among a first satellite network, the second satellite network, and the terminal device is implemented.

For ease of understanding, a method provided in embodiments of the present application is described in detail below with reference to FIG. 5. It should be understood that the method shown in FIG. 5 is performed by a terminal device.

The terminal device is any one of the terminal devices described above. In some embodiments, the terminal device is a communications device that is served by a satellite in an NTN system. In some embodiments, the terminal device is a communications device with a relatively low service transmission rate.

Reference is made to FIG. 5. In Step S510, a first handover command is received.

The first handover command received by terminal device is from a first satellite network. In other words, a network device corresponding to the first satellite network transmits the first handover command to the terminal device, so as to instruct the terminal device to perform handover from a coverage of the first satellite network to a coverage of a second satellite network. In the NTN system, the first satellite network may be referred to as a source NTN1, and the second satellite network may be referred to as a target NTN2. In some embodiments, the first satellite network transmits a handover preparation instruction to the second satellite network after determining a network device corresponding to the second satellite network. After receiving a handover response transmitted by the second satellite network, the first satellite network transmits the first handover command to the terminal device.

The coverage of the first satellite network is an area in which the first satellite network provides a communication service. In some scenarios, the coverage of the first satellite network may also be referred to as a source cell. In some embodiments, the first satellite network serves a terminal device within the coverage by using a network device corresponding to the first satellite network. In some embodiments, there may be one or more terrestrial network cells within the coverage of the first satellite network.

The coverage of the second satellite network is an area in which the second satellite network provides a communication service. In some scenarios, the coverage of the second satellite network may also be referred to as a target cell. In some embodiments, the second satellite network serves a terminal device within the coverage by using a network device corresponding to the second satellite network. In some embodiments, there may be one or more terrestrial network cells within the coverage of the second satellite network.

Satellite handover indicates handover of a satellite corresponding to an area where the terminal device is located. In some embodiments, satellite handover may be cell handover. In some embodiments, a physical cell identity (physical cell identity, PCI) of a coverage does not change during satellite handover.

The network device corresponding to the first satellite network is a communications device that serves the terminal device at a current instant. The network device may move relative to the terminal device. In some embodiments, the network device corresponding to the first satellite network may be a base station that serves the terminal device by using a satellite in the NTN system. For example, the network device corresponding to the first satellite network may be a non-geostationary earth orbit (non-geostationary earth orbit, NGEO) satellite. In some embodiments, the network device corresponding to the first satellite network may be a non-satellite mobile network device. For example, the network device corresponding to the first satellite network is a base station installed on a low-altitude aircraft. For brevity, the first satellite network in the following description may also represent the network device corresponding to the first satellite network.

The network device corresponding to the second satellite network is a next network device that serves the terminal device. In some embodiments, the first satellite network may determine by itself the network device corresponding to the second satellite network. For example, because a motion trajectory of a satellite may be determined, the first satellite network may determine the second satellite network corresponding to the terminal device without obtaining a measurement report of the terminal device. Generally, the network device corresponding to the second satellite network is a network device whose motion trajectory is predictable. For example, the network device corresponding to the second satellite network may be a satellite in the NTN system. The first satellite network may determine, based on ephemeris information, a network device that is about to serve the terminal device. For another example, the network device corresponding to the second satellite network may be a non-satellite mobile network device. The first satellite network may determine, based on a preset parameter, the network device that is about to serve the terminal device. For brevity, the second satellite network in the following description may also represent the network device corresponding to the second satellite network.

The first handover command may be a command that the terminal device cannot perform satellite handover through an RACH. For example, the first handover command is a RACH-less handover command. For another example, the first handover command does not provide any resource that is used by the terminal device for random access. Embodiments of the present application are described below in detail by using RACH-less handover as an example.

In some embodiments, the first satellite network may determine, based on an actual condition, whether to transmit an RACH-less handover command to the terminal device. In some embodiments, when the terminal device in the source NTN1 is to be handed over to the target NTN2 due to movement of a satellite or another reason, RACH-less handover may be selected preferentially for reducing a handover delay.

Information in the first handover command may be used by the terminal device for the satellite handover. For example, the first handover command may include handover information configured by the second satellite network for the terminal device, thereby being beneficial for the terminal device to establish communication with the second satellite network. For another example, before performing RACH-less handover, the terminal device receives, from the first satellite network, configuration information used for handover. The information may be carried in the first handover command.

In some embodiments, the first handover command may include a pre-allocated grant.

In some embodiments, the first handover command may include a time-related parameter of the second satellite network.

In Step S520, first synchronization is performed with a second satellite network based on a first parameter before satellite handover is performed.

Generally, it is unnecessary for the terminal device to perform satellite handover immediately after receiving the first handover command. Therefore, the terminal device may prepare for satellite handover before performing satellite handover.

In some embodiments, the terminal device may determine an occasion for satellite handover after receiving the first handover command. For example, the terminal device may determine, based on a result of measurement performed in the first satellite network, whether to perform handover immediately. For another example, the terminal device may start a timing apparatus immediately after receiving the first handover command, and determine, based on the timing apparatus, when to perform satellite handover. For still another example, the terminal device may determine when to perform satellite handover based on both the measurement result and the timing apparatus.

In an embodiment, measurement performed by the terminal device in the first satellite network may be measurement performed by the terminal device on different reference signals of the first satellite network. This is not limited herein.

In an embodiment, a result of measurement performed by the terminal device in the first satellite network may be referred to as a first measurement result of measurement performed on the first satellite network. For example, the first measurement result may be reference signal received power (reference signal received power, RSRP), reference signal received quality (reference signal received quality, RSRQ), or reference signal strength indicator (reference signal strength indicator, RSSI), or may be the plurality of parameters described above. This is not limited herein.

In an embodiment, a timing apparatus started by the terminal device after the first handover command is received may be referred to as a first timer. In other words, after receiving the first handover command, the terminal device starts the first timer before performing satellite handover. The first timer may be an existing timer, or may be a newly configured timer. For example, the first timer may be a newly configured timer $T_m$.

In an embodiment, the first timer may alternatively be set and started in the first satellite network.

In an embodiment, duration of the timing apparatus may be a fixed value configured by a higher layer, or may be determined based on a service type of the terminal device, or may be dynamically adjusted based on a communication environment. This is not limited herein.

The process of performing first synchronization with the second satellite network by the terminal device includes that the terminal device performs first synchronization with the second satellite network based on information of the second satellite network provided by the first satellite network. Because first synchronization is performed before satellite handover, that is, when the terminal device has not established communication with the second satellite network, the terminal device performs synchronization with a virtual network. Therefore, first synchronization may also be referred to as virtual synchronization.

Because the terminal device cannot establish connection with the second satellite network through a random access channel, the second satellite network cannot determine a real TA value of the terminal device. To prevent the terminal device from missing an uplink resource scheduled by the second satellite network for the terminal device, it is necessary to ensure that terminal device, the first satellite network, and the second satellite network are synchronized. The terminal device and the first satellite network are in a synchronized state. Therefore, it is necessary for the terminal device to establish synchronization with the second satellite network.

First synchronization is used for time alignment between the terminal device and the second satellite network, and may also be referred to as first alignment.

In some embodiments, the first synchronization includes uplink synchronization and/or downlink synchronization. Both uplink synchronization and downlink synchronization indicate synchronization between transmission instants of the terminal device and the second satellite network. For example, to maintain uplink and downlink synchronization with the second satellite network, the terminal device may adjust a time sequence of initial uplink transmission based on received information, to be synchronized with a time sequence of uplink transmission of the second satellite network.

In some embodiments, execution duration of first synchronization may be determined based on a time at which satellite handover is to be performed, or may be determined based on the first timer described above. For example, the terminal device stops first synchronization when duration of the first timer expires.

The first parameter based on which the terminal device performs first synchronization with the second satellite network may be determined based on a variety of parameter information used for synchronization. It should be noted that the first parameter may be used only for the first synchronization, and may also be used by the terminal device for the satellite handover. Therefore, the first parameter may be used by the terminal device for first synchronization and/or satellite handover.

In some embodiments, the first parameter may be determined based on location information of the terminal device and/or configuration information of the second satellite network for satellite handover. In an NTN, the first parameter may alternatively be determined based on ephemeris information of a second satellite. For example, the second satellite may be the network device corresponding to the second satellite network.

In an embodiment, the configuration information used for satellite handover may include timing and synchronization parameters of the second satellite network. For example, the first parameter may include a scheduling timing offset (for example, a scheduling offset corresponding to the second satellite network), a round-trip time between a communications device and a reference point, a target base station associated with the second satellite network, a common TA, common TA validity duration associated with the common TA, or other information.

In an embodiment, in an NTN cell, the first parameter further includes satellite ephemeris information, ephemeris validity duration associated with the satellite ephemeris information, or other information. An indication of satellite ephemeris information may include trajectory data associated with a satellite, for example, a location and a speed of the satellite serving as time functions.

In an embodiment, when the first parameter includes an indication of ephemeris information and an indication of a common TA, the terminal device may calculate a total TA value based on these parameters provided by the network device, so as to perform first synchronization and synchronization in satellite handover.

In an embodiment, the location information of the terminal device may be determined based on the GNSS. For example, to achieve synchronization before and during connection to a target NTN2 cell, the terminal device calculates a service link RTT based on a GNSS location and a satellite ephemeris, and autonomously pre-compensates a TTA. The terminal device calculates a frequency Doppler shift based on a location of the terminal device and satellite ephemeris information. In a case that the terminal device does not know valid location information and valid satellite ephemeris information, the terminal device cannot communicate with a network until both of valid location information and valid satellite ephemeris information are obtained.

At least some of the first parameters are determined based on information in the first handover command. In some embodiments, some of the first parameters are determined based on the first handover command, and some of the information is known by the terminal device. For example, a location parameter of the terminal device in the first parameters may be known to the terminal device, and it is unnecessary to contain the information in the first handover command. In some embodiments, all of the first parameters are determined based on the first handover command. For example, all of location information, configuration information, and ephemeris information that are used to determine the first parameter are carried in the information of the first handover command. In this case, the location information of the terminal device may alternatively be determined and informed by the first satellite network.

In some embodiments, when the first parameter is used only for first synchronization, information in the first parameter may include only a part of the information in the first handover command.

In some embodiments, when the first parameter is used for first synchronization and satellite handover, the information in the first parameter may include all the information in the first handover command.

In some embodiments, the terminal device may alternatively perform first synchronization based on a first scheduling offset. Because scheduling offsets of the first satellite network and the second satellite network are different, there is a deviation between a scheduling time for an uplink and a downlink. As a result, the terminal device cannot perform first synchronization by using a second scheduling offset corresponding to the first satellite network as a reference. Because the terminal device has not been completely handed over to the second satellite network yet, even if the first handover command contains a third scheduling offset corresponding to the second satellite network, first synchronization cannot be performed by using the third scheduling offset as a reference. The first scheduling offset provided in embodiments of the present application may be determined based on time parameters of the first satellite network and the second satellite network. The parameter may be shared by the second satellite network and the terminal device. In some scenarios, the second satellite network may schedule an uplink resource based on the first scheduling offset, and the terminal device may also perform uplink transmission based on the first scheduling offset, thereby being beneficial to prevent the terminal device from missing the uplink resource. Further, first synchronization is performed based on a scheduling offset, so that the terminal device can perform synchronization with the second satellite network while remaining a synchronized state with the first satellite network.

Figure 6:
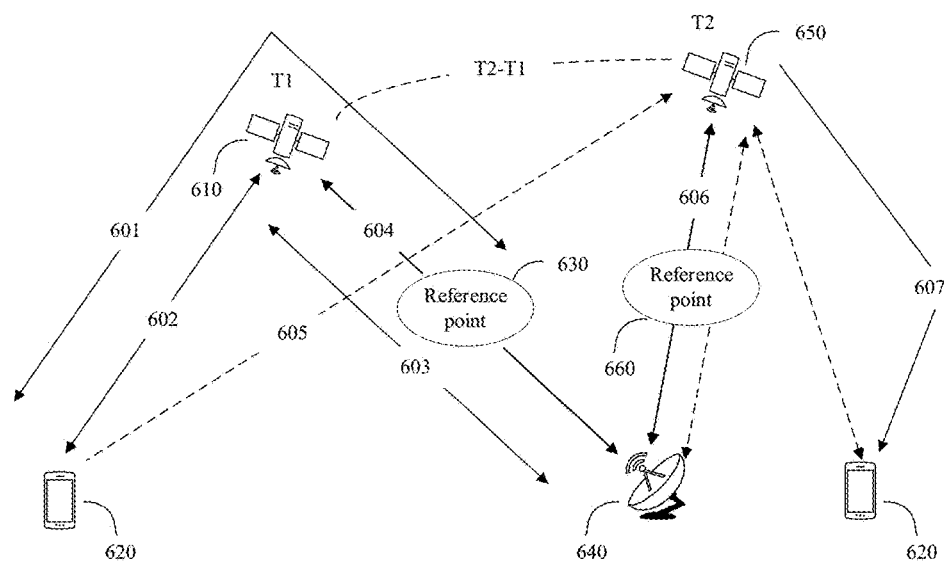
FIG. 6 is a schematic diagram of a timing relationship of first synchronization performed by the terminal device.

For ease of understanding, a timing relationship between the first scheduling offset and another scheduling offset is described below with reference to FIG. 6 by using an NTN system as an example. FIG. 6 is a schematic diagram of a timing relationship of first synchronization with a second satellite network performed by a terminal device. It should be understood that FIG. 6 is only schematic rather than restrictive. A relationship among parameters in FIG. 6 is similar to that in FIG. 4. For brevity, terms already explained in FIG. 4 are not described again.

Reference is made to FIG. 6. A satellite 610 is a network device corresponding to a first satellite network. A satellite 650 is a network device corresponding to the second satellite network. As shown in FIG. 6, the satellite 610 and the satellite 650 communicate with a same gateway 640. Therefore, satellite handover performed by a terminal device 620 is handover between satellites having a same feeder link.

In FIG. 6, a reference point 630 is the same as the reference point 430 in FIG. 4; and reference points 601 to 604 are the same as reference points 401 to 404 in FIG. 4. 601 corresponds to a scheduling offset of the satellite 610, namely, a second scheduling offset. 605 corresponds to a scheduling offset between the satellite 650 and the terminal device 620, namely, a first scheduling offset. 606 represents a common TA between the satellite 650 and the gateway 640, namely, a common TA of the second satellite network. 607 corresponds to a scheduling offset of the satellite 650, namely, a third scheduling offset.

In some embodiments, after a first handover command is received by the terminal device, the first scheduling offset may be determined based on a first parameter. For example, time parameters of the first satellite network and the second satellite network among the first parameter may be used to determine the first scheduling offset. The time parameter may include a second parameter. The second parameter represents a time difference caused by a distance between the first satellite network and the second satellite network.

For example, the first scheduling offset may be determined based on the second scheduling offset and the second parameter. The scheduling offset is $K_{offset}$ described above. The second scheduling offset corresponding to the first satellite network may be denoted by $K_{offset1}$. The third scheduling offset corresponding to the second satellite network may be represented by $K_{offset2}$. Because the first scheduling offset is a parameter introduced for first synchronization performed with the second satellite network by the terminal device, the first scheduling offset may be denoted by $K_{offset2\text{-}temp}$.

In some scenarios, the first scheduling offset $K_{offset2\text{-}temp}$ is determined according to the following formula:

$$K_{offset2-temp} = K_{offset1} + (T2 - T1),$$

where T2 denotes a reference time when it is handed over from the first satellite network to the second satellite network; and T1 denotes a current reference time of the first satellite network.

With reference to FIG. 6, a transmission instant of the first satellite network corresponding to the satellite 610 is T1, and a transmission instant of the second satellite network corresponding to the satellite 620 is T2. The first scheduling offset $K_{offset2\text{-}temp}$ is calculated according to the first scheduling offset and a difference between transmission instants of the two satellites, as shown in the above formula.

The first synchronization may be used to determine a third parameter used by the terminal device for the satellite handover. In some embodiments, the third parameter may include one or more of the following parameters: a TA used by the terminal device for the satellite handover; a first time point when the terminal device performs the satellite handover; or a first time domain location at which the terminal device performs uplink transmission to the second satellite network during the satellite handover.

In some embodiments, the third parameter may alternatively be determined based on one or more of the following pieces of information: a first scheduling offset; a third scheduling offset corresponding to the first satellite network; a parameter of a first timer; or a first measurement result of measurement performed on the first satellite network by the terminal device. The parameter of the first timer is, for example, a start time point and a duration of the first timer.

In some embodiments, the TA used by the terminal device for the satellite handover may be determined in a plurality of manners. During satellite handover, after receiving a TA command (command) at a slot (slot) n, the terminal device should adjust an uplink transmission time (UL transmission timing) based on the TA command at a slot n+k+1. In other words, the scheduling offset may be used to determine an uplink slot used for uplink transmission; and TA is used to determine when to transmit an uplink frame/slot. Therefore, it is necessary to separately determine a TA of a target satellite and a scheduling offset between uplink scheduling and downlink scheduling.

In an embodiment, the first synchronization may determine the TA used by the terminal device for the satellite handover. For example, the terminal device may use the first scheduling offset as a reference for adjusting a TA, to prepare for synchronization with the second satellite network. For example, after receiving the first handover command, the terminal device starts the first timer described above; and when the first timer starts timing, the terminal device adjusts, based on the first scheduling offset, the TA for satellite handover. The TA determined based on the first scheduling offset may be a TA used for first synchronization, or may be a TA used for determining satellite handover.

In an embodiment, the TA used by the terminal device for the satellite handover may alternatively be determined based on information in the first handover command. For example, the terminal device may calculate, based on a synchronization parameter received from a network device, a total TA for satellite handover.

In an embodiment, a TA of the terminal device in the second satellite network may alternatively be estimated based on a TA in the first satellite network. For example, the terminal device may obtain a difference between the transmission instant of the first satellite network and the transmission instant of the second satellite network (namely, T1-T2) based on the first handover command. Assuming that an uplink propagation delay is the same as a downlink propagation delay, the terminal device may derive $TA_2$ of a virtual second satellite network or the second satellite network from $TA_1$ of the first satellite network according to the following formula:

$$TA_2 = TA_1 - 2(T_1 - T_2).$$

Optionally, in a case that no command indicating a time point of a network device corresponding to the second satellite network is displayed, the first satellite network where terminal device is located may transmit a request message to request a time of the second satellite network. The second satellite network may transmit its own time point by transmitting a response message. The second satellite network may also transmit another satellite parameter, so that the first satellite network can identify the time point of the second satellite network.

In some embodiments, a first time point at which the terminal device performs satellite handover may be determined in a plurality of manners. The first time point is the above-mentioned occasion at which the terminal device performs satellite handover. It may be learned from the foregoing description that the first time point may be determined based on the first measurement result and the first timer. The start time point of the first timer may be used to determine a time at which the first handover command is received. The duration of the first timer may be used to limit duration during which the terminal device prepares for satellite handover and/or performs first synchronization.

In an embodiment, the first time point may alternatively be determined based on first synchronization. For example, the first timer is associated with first synchronization. Therefore, the first time point being determined based on first synchronization may be replaced with the first time point being determined based on the first timer. For another example, a magnitude relationship between the first scheduling offset and the third scheduling offset in first synchronization may be used to determine the first time point.

In an embodiment, in a case that the first measurement result indicates that the satellite handover is not performed at a current instant, the first time point may be determined based on the first timer and/or determined by the terminal device itself. Being determined by the terminal device itself includes that the terminal device may determine the occasion for satellite handover based on information such as a service type.

In some embodiments, the third parameter further includes the first time domain location at which the terminal device performs uplink transmission to the second satellite network during the satellite handover. The uplink transmission may be initial uplink transmission of satellite handover performed by the terminal device. By determining the first time domain location, synchronization can be achieved completely before and during connecting the terminal device to the second satellite network. In a case that the first satellite network, the second satellite network, and the terminal device are synchronized, the initial uplink transmission may match uplink grant scheduled by the second satellite network.

In an embodiment, in a case that the first measurement result indicates that the satellite handover is performed at the current instant, that is, the first measurement result indicates that handover is to be performed immediately, the terminal device performs the satellite handover based on the first handover command. In a case that the first measurement result indicates that the satellite handover is not performed at the current instant, that is, it is unnecessary for the terminal device to perform handover immediately, a first time threshold may be determined based on the first timer, or may be determined by the terminal device itself.

In an embodiment, when the first measurement result indicates that the satellite handover is performed at the current instant, in a case that the first scheduling offset is equal to the third scheduling offset, a second time domain location is determined based on the third scheduling offset; in a case that the first scheduling offset is less than the third scheduling offset, a second time domain location is determined based on the first scheduling offset and a difference between the first scheduling offset and the third scheduling offset; and in a case that the first scheduling offset is greater than the third scheduling offset, a second time domain location is determined based on the first scheduling offset.

For ease of understanding, embodiments for determining the first time threshold or the first time point are described below in detail based on three magnitude relationships between the first scheduling offset $K_{offset2\text{-}temp}$ and the third scheduling offset $K_{offset2}$.

Embodiment 1: $K_{offset2\text{-}temp} = K_{offset2}$

No matter whether duration of the first timer expires, in a case that the first measurement result measured by the terminal device in the first satellite network indicates that handover is to be performed immediately, the terminal device starts to perform RACH-less handover, and starts to transmit data to the second satellite network at the same time.

In a case that the first measurement result indicates that it is unnecessary to perform handover immediately, when duration of the first timer expires, the terminal device starts to perform RACH-less handover, and starts to transmit data to the second satellite network at the same time. In a case that duration of the first timer does not expire, the terminal device may maintain connection with the first satellite network until the duration of the first timer expires.

Embodiment 2: $K_{offset2\text{-}temp} < K_{offset2}$

In a case that the first measurement result measured by the terminal device in the first satellite network indicates that handover is to be performed immediately, the terminal device starts to perform RACH-less handover, regardless of whether duration of the first timer expires. In a case that the terminal device receives a TA command in a slot n of the first satellite network, to maintain uplink and downlink synchronization with the second satellite network, an uplink transmission time sequence corresponding to the second satellite network is adjusted to start transmission from an uplink slot $n+k+1+2^{\mu} \cdot (K_{offset2\text{-}temp}) + 2^{\mu} \cdot (K_{offset2} - K_{offset2\text{-}temp})$, where $\mu$ is determined based on subcarrier spacing; and k is determined based on transmission response duration and a quantity of slots. It should be understood that for a values of k, one may refer to a provision in a related 3GPP specification. In some scenarios, k may alternatively be determined based on PUSCH transmission timing (timing), namely, a time sequence related to k2. The PUSCH transmission timing may include timing reported in PUSCH transmission channel state information (channel state information, CSI).

In a case that the first measurement result indicates that it is unnecessary to perform handover immediately, when duration of the first timer expires, the terminal device starts to perform RACH-less handover, and starts to transmit data to the second satellite network at the same time. In a case that duration of the first timer does not expire, the terminal device may maintain connection with the first satellite network until the duration of the first timer expires.

Embodiment 3: $K_{offset2\text{-}temp} > K_{offset}$

In a case that the first measurement result measured by the terminal device in the first satellite network indicates that handover is to be performed immediately, after the network device issues the first handover command, the terminal device starts to perform RACH-less handover, regardless of whether duration of the first timer expires. In a case that the terminal device receives a TA command in a slot n of the first satellite network, to maintain uplink and downlink synchronization with the second satellite network, an uplink transmission time sequence corresponding to the second satellite network is adjusted to start transmission from an uplink slot $n+k+1+2^{\mu} \cdot (K_{offset2\text{-}temp})$.

In a case that the first measurement result indicates that it is unnecessary to perform handover immediately, even if a network side has issued the first handover command, the terminal device may also determine by itself whether to perform handover immediately or to wait. Alternatively, when duration of the first timer expires, the terminal device starts to perform RACH-less handover, and starts to transmit data to the second satellite network at the same time. In a case that duration of the first timer does not expire, the terminal device may keep communicating with the first satellite network, and postpone handover. The terminal device does not start handover until the duration of the first timer expires.

Optionally, the terminal device may alternatively determine to perform handover when the duration of the first timer does not expire. The terminal device may continuously transmit a reference signal or repeat a previous data packet to the second satellite network within a waiting slot $K_{offset2\text{-}temp} - K_{offset2}$, to wait for completion of uplink and downlink synchronization.

It may be learned from FIG. 5 that the terminal device may perform the first synchronization with the virtual second satellite network based on the first scheduling offset before satellite handover is performed. The second satellite network may also determine the first scheduling offset. When the second satellite network schedules an uplink resource based on the first scheduling offset, the terminal device performs synchronization with the second satellite network based on the first scheduling offset, thereby preventing from missing a scheduled uplink resource configured by the second satellite network for the terminal device. The first satellite network, the second satellite network, and the terminal device are also synchronized through first synchronization, thereby realizing RACH-less satellite handover.

The first satellite network, the second satellite network, and the terminal device are synchronized through first synchronization, and the terminal device may perform satellite handover. For example, when satellite handover is RACH-less handover, the terminal device may perform initial uplink transmission to the second satellite network by using an available uplink grant (RRC, MAC PHY) and receive acknowledgment information of the second satellite network.

In some embodiments, when the first satellite network, the second satellite network, and the terminal device are synchronized, subframe boundaries between the first satellite network and the second satellite network are aligned. At a time (for example, an SFN) agreed upon by both parties, the terminal device performs handover from the first satellite network to the second satellite network.

In some embodiments, the first satellite network, the second satellite network, and the terminal device may be synchronized by using RRC signalling. After synchronization is completed, the first satellite network stops downlink transmission to the terminal device; the second satellite network provides an uplink grant for the terminal device; and the terminal device establishes communication with the second satellite network.

In some embodiments, timing of T430 is started when the terminal device is handed over to the second satellite network; and T430 may be used to control uplink synchronization (UL synchronization) and uplink synchronization lost (UL synchronization lost). It is also embodied in an MAC layer.

For example, the terminal device may perform uplink transmission normally when being in an uplink synchronized state. In a case that an RRC layer notifies, due to expiration of T430, the MAC layer that the terminal device is currently in an uplink out-of-synchronization state, the MAC layer stops all hybrid automatic repeat reQuest (hybrid automatic repeat reQuest, HARQ) buffers (buffers) and cannot perform any uplink transmission.

In some embodiments, the terminal device may fail to perform satellite handover. For example, when the first handover command is for RACH-less handover, handover fails in a case that a condition for RACH-less handover cannot be met. A RACH-less failure means that the terminal device cannot successfully access the second satellite network by using a RACH-less process. For example, the second satellite network cannot successfully decode initial uplink transmission from the terminal device; or the terminal device has not received, from a network before T304 expires, any acknowledgment that handover is completed. After T304 expires, the terminal device performs a re-establishment process.

In a case that the terminal device always performs RACH-less handover, the terminal device may fail all the time. To resolve this problem, the terminal device may support a backoff function. The backoff function is used to implement backoff of the terminal device from RACH-less handover to RACH-based handover. For example, when RACH-less handover is first handover, and RACH-based handover is second handover, the terminal device supports backoff from first handover to second handover. Alternatively, the terminal device may perform backoff from first handover to second handover according to an indication of the network device.

In some scenarios, a failure of RACH-less handover of the terminal device may only be a failure in information transmission. In a case that RACH-less handover is backed off to RACH-based handover once handover fails, a relatively long handover delay may be generated. To resolve this problem, the terminal device may back off from RACH-less handover to RACH-based handover only when RACH-less handover fails for a plurality of times.

In some embodiments, the terminal device may determine a quantity of failures of first handover by setting a first threshold. For example, a quantity of times for which first handover is to be performed may be set as the first threshold. In a case that a quantity of times for which first handover performed by the terminal device fails is greater than the first threshold, backoff to second handover is performed.

In an embodiment, the terminal device may determine a quantity of failures of RACH-less handover by setting a first threshold. For example, a quantity of times for which RACH-less handover is to be performed may be set as a threshold (namely, the first threshold). In a case that a quantity of times for which RACH-less handover performed by the terminal device fails is greater than the first threshold, backoff to RACH-based handover is performed.

In some scenarios, RACH-less handover may be combined with a case in which a PCI remains unchanged. When the PCI remains unchanged, the network device may implicitly or explicitly notify the terminal device of NTA of the second satellite network. In a case that RACH-less handover is combined with a scenario in which a PCI remains unchanged, the terminal device performs only a downlink synchronization process, thereby simplifying an entire RACH-less process of handover between satellites having a same gateway/base station, and thus being beneficial to shorten a delay in a PCI-invariant scenario.

In some scenarios, the first satellite network may alternatively indicate RACH-less handover by using other signalling instead of a handover command.

A problem caused by introducing RACH-less handover in an NTN system and a solution to the problem are described above according to embodiments of the present application. For ease of understanding, with reference to FIG. 7 and FIG. 8, embodiments of the present application are described below by using examples.

Figure 7:
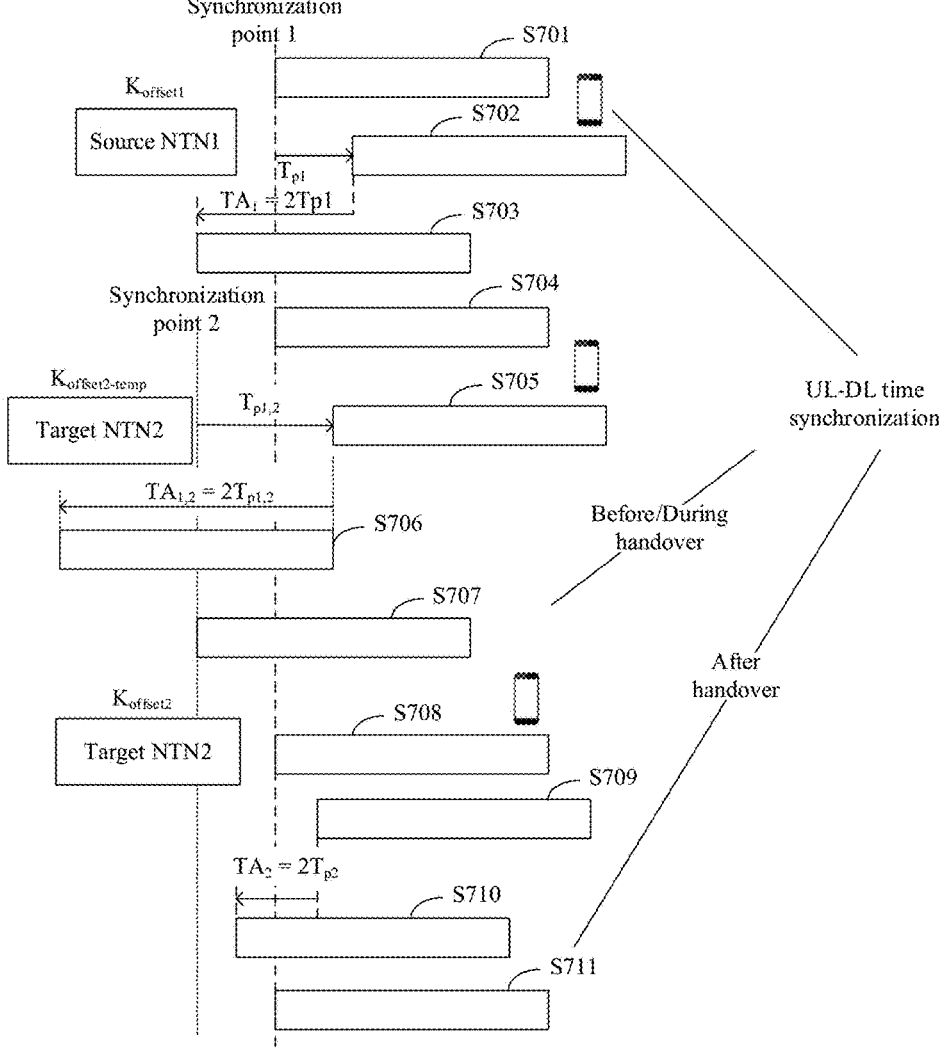
FIG. 7 is a schematic flowchart of a possible implementation according to an embodiment of the present application.

FIG. 7 shows, by using NTNs as examples, an entire synchronization process of synchronization performed between a terminal device, a first satellite network (a source NTN1) and a second satellite network (a target NTN2).

Reference is made to FIG. 7. In Step S701, the terminal device maintains synchronized with the NTN1 when being in the source NTN1. As shown in FIG. 7, the terminal device is synchronized with the source NTN1 at a synchronization point 1.

In Step S702 and Step S703, $TA_1$ of the terminal device in the source NTN1 changes with movement of a satellite or when a location of the terminal device changes. The first satellite network instructs, by transmitting a TA command, the terminal device to adjust $TA_1$ continuously, regardless of a quasi-earth fixed cell or a quasi-earth mobile cell. When the terminal device receives a deviation of $T_{p1}$, the terminal device performs transmission in a next slot or next several slots by using $TA_1 = 2T_{P1}$.

In the source NTN1, a TA command instructing the terminal device to perform TA adjustment after entering a connected state is issued to the terminal device by a network side by using a Timing Advance Command MAC CE. A TA index (index) corresponding to the TA command represents adjustment to be subjected to by current $N_{TA}$. In other words, a network transmits a MAC CE-related TA command to the terminal device, so as to adjust a transmission TA.

In Step S704, the terminal device is synchronized with the source NTN1 again.

In Step S705, the terminal device receives a RACH-less handover command. When a timer of the source NTN1 or a timer $T_m$ (first timer) of the terminal device is started, the terminal device prepares for handover. Initial uplink and downlink alignment with the target NTN2, namely, first synchronization is started within a duration of the timer $T_m$. The terminal device performs initial alignment based on its own location and a received satellite parameter that is of a related target NTN2 and transmitted by the source NTN1. At this time, the terminal device has not been handed over to the target NTN2. Relative to the terminal device, a reference time point (a synchronization point 2) of a virtual target NTN2 is a dotted line in FIG. 7.

In Step S706, the terminal device still cannot receive information from the NTN2. A temporary offset $K_{offset2-temp}$ may be obtained based on a difference between times of the source NTN1 and the target NTN2. The terminal device stays at the same location, a value of $T_{p1,2}$ may be estimated based on $T_{p1}$ and the difference between the times of the source NTN1 and the target NTN2. $TA_{1,2} = 2T_{p1,2}$. The terminal device adjusts its own TA within the duration of the timer $T_m$. For example, $TA_{1,2} = TA_1 - 2(T1 - T2)$.

In Step S707, the terminal device is synchronized with the virtual NTN2 within the duration of the timer $T_m$.

In Step S708, the terminal device starts the timer T304 and performs, by using an available uplink grant (RRC, MAC, or PHY), initial uplink transmission including an RRCReconfigurationComplete message. The terminal device performs uplink and downlink synchronization with a real target NTN2.

In Step S709, an acknowledge that RACH-less handover is completed is received from the target NTN2. The timer T304 is stopped.

Step S710 and Step S711 are the same as Step S701 and Step S702. The terminal device successfully communicates with the NTN2.

As shown in FIG. 7, the terminal device ensures, in an entire synchronization process, uplink and downlink time synchronization before, during, and after handover.

Figures 8, 9, 10:
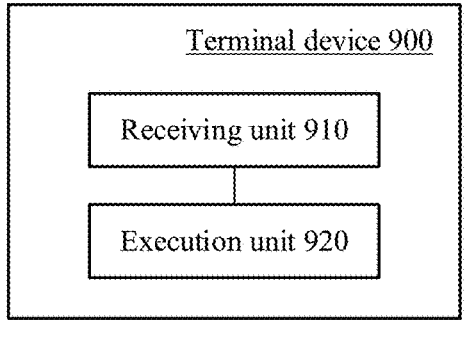
FIG. 8 is a schematic flowchart of another possible implementation according to an embodiment of the present application.
FIG. 9 is a schematic structural diagram of a terminal device according to an embodiment of the present application.
FIG. 10 is a schematic structural diagram of a network device according to an embodiment of the present application.

FIG. 8 is described from a perspective of interaction between a terminal device, and a first satellite network and a second satellite network.

Reference is made to FIG. 8. In Step S810, the terminal device receives a RACH-less handover command, namely, a first handover command, transmitted by the first satellite network.

In Step S820, the terminal device or the first satellite network starts a first timer.

In Step S830, within the duration of the first timer, the terminal device performs initial uplink and downlink alignment (first synchronization) with the second satellite network.

In Step S840, the terminal device starts a timer T304.

In Step S850, the terminal device performs uplink and downlink synchronization and starts a timer T430.

In Step S860, the terminal device performs initial uplink transmission. The initial uplink transmission is performed by using an available uplink grant (RRC, MAC, or PHY). The initial uplink transmission includes transmission of an RRCReconfigurationComplete message.

In Step S870, the terminal device receives, from a network (network, NW), an acknowledgment that RACH-less handover is completed.

In Step S880, the terminal device stops the timer T304.

Method embodiments of the present application are described in detail above with reference to FIG. 1 to FIG. 8. Apparatus embodiments of the present application are described in detail below with reference to FIG. 9 to FIG. 12. It should be understood that the description of the apparatus embodiments corresponds to the description of the method embodiments. Therefore, for parts that are not described in detail, reference may be made to the foregoing method embodiments.

FIG. 9 is a schematic block diagram of a terminal device according to an embodiment of the present application. The terminal device 900 may be any one of the terminal devices described above. The terminal device 900 shown in FIG. 9 includes a receiving unit 910 and an execution unit 920.

The receiving unit 910 may be configured to receive a first handover command, where the first handover command is used to instruct a terminal device to perform satellite handover from a coverage of a first satellite network to a coverage of a second satellite network.

The execution unit 920 may be configured to perform first synchronization with the second satellite network based on first parameters before the satellite handover is performed, where at least some of the first parameters are determined based on information in the first handover command.

Optionally, the terminal device 900 further includes a first determining unit that may be configured to: after the first handover command is received and before the satellite handover is performed, determine a first scheduling offset based on the first parameter, where the first scheduling offset is used for first synchronization.

Optionally, the first scheduling offset is determined based on a second scheduling offset and a second parameter, where the second scheduling offset corresponds to the first satellite network; and the second parameter is a time difference caused by a distance between the first satellite network and the second satellite network.

Optionally, the first scheduling offset is determined according to the following formula:

$$K_{offset2-temp} = K_{offset1} + (T2 - T1),$$

where $K_{offset2-temp}$ denotes the first scheduling offset; $K_{offset1}$ denotes the second scheduling offset; T2 denotes a reference time when it is handed over from the first satellite network to the second satellite network; and T1 denotes a current reference time of the first satellite network.

Optionally, the execution unit 920 is further configured to: start a first timer after the first handover command is received and before the satellite handover is performed, where the first timer is configured to determine execution duration of the first synchronization.

Optionally, the third parameter includes one or more of the following parameters: a TA used by the terminal device for the satellite handover; a first time point when the terminal device performs the satellite handover; or a first time domain location at which the terminal device performs uplink transmission to the second satellite network during the satellite handover.

Optionally, the first synchronization is used to determine a third parameter used by the terminal device for the satellite handover. The third parameter is determined based on one or more of the following pieces of information: a first scheduling offset; a third scheduling offset corresponding to the second satellite network; a parameter of a first timer; or a first measurement result of measurement performed on the first satellite network by the terminal device.

Optionally, the first measurement result indicates that the satellite handover is performed at a current instant. The terminal device 900 further includes a second determining unit that may be configured to: determine the first time domain location based on the third scheduling offset in a case that the first scheduling offset is equal to the third scheduling offset; determine the first time domain location based on the first scheduling offset and a difference between the first scheduling offset and the third scheduling offset, in a case that the first scheduling offset is less than the third scheduling offset; and determine the first time domain location based on the first scheduling offset in a case that the first scheduling offset is greater than the third scheduling offset.

Optionally, the first time domain location is determined based on a second time domain location at which a TA command is received by the terminal device. When the second time domain location is a slot n, in a case that the first scheduling offset $K_{offset2-temp}$ is less than the third scheduling offset $K_{offset2}$, the first time domain location is a slot $n+k+1+2^{\mu} \cdot (K_{offset2-temp})+2^{\mu} \cdot (K_{offset2}-K_{offset2-temp})$; or in a case that the first scheduling offset $K_{offset2-temp}$ is greater than the third scheduling offset $K_{offset2}$, the first time domain location is a slot $n+k+1+2^{\mu} \cdot (K_{offset2-temp})$, where $\mu$ is determined based on subcarrier spacing; and k is determined based on transmission response duration and a quantity of slots.

Optionally, the first measurement result indicates that the satellite handover is not performed at a current instant; and the first time point is determined based on the first timer and/or determined by the terminal device itself.

Optionally, the first parameter is determined based on at least one of location information of the terminal device, configuration information of the second satellite network used for the satellite handover, or ephemeris information of a second satellite.

Optionally, the first handover command is an RACH-less handover command.

Optionally, handover indicated by the first handover command is first handover; the terminal device supports backoff from first handover to second handover; and second handover is performed based on an RACH.

Optionally, the execution unit 920 is further configured to perform second handover in a case that a quantity of failures of first handover is greater than a first threshold.

Optionally, the first synchronization includes uplink synchronization and/or downlink synchronization.

FIG. 10 is a schematic block diagram of a network device according to an embodiment of the present application. The network device 1000 may be any one of the above-described network devices corresponding to the first satellite network. The network device 1000 shown in FIG. 10 includes a transmitting unit 1010.

The transmitting unit 1010 may be configured to transmit a first handover command to a terminal device, where the first handover command is used to instruct the terminal device to perform satellite handover from a coverage of the first satellite network to a coverage of a second satellite network. The first handover command is used to determine at least some of first parameters; and the first parameter is used by the terminal device to perform first synchronization with the second satellite network before the satellite handover is performed.

Optionally, the network device 1000 further includes an execution unit that may be configured to start a first timer, after the first handover command is transmitted and before the terminal device performs the satellite handover. The first timer is configured to determine execution duration of the first synchronization.

Optionally, the first parameter is determined based on at least one of location information of the terminal device, configuration information of the second satellite network used for the satellite handover, or ephemeris information of a second satellite.

Optionally, the first handover command is an RACH-less handover command.

Optionally, handover indicated by the first handover command is first handover; the network device 1000 supports backoff from first handover to second handover; and second handover is performed based on an RACH.

Optionally, second handover is performed in a case that a quantity of failures of first handover is greater than a first threshold.

Optionally, the first synchronization includes uplink synchronization and/or downlink synchronization.

Figure 11:
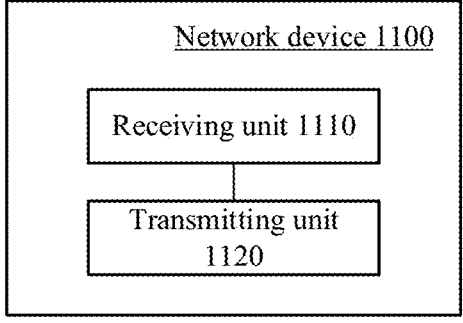
FIG. 11 is a schematic structural diagram of another network device according to an embodiment of the present application.

FIG. 11 is a schematic block diagram of another network device according to an embodiment of the present application. The network device 1100 may be any one of the above-described network devices corresponding to the second satellite network. The network device 1100 shown in FIG. 11 includes a receiving unit 1110 and a transmitting unit 1120.

The receiving unit 1110 may be configured to receive a handover request transmitted by a first satellite network.

The transmitting unit 1120 may be configured to transmit a handover response message to the first satellite network. The handover response message is used by the first satellite network for determining a first handover command; the first handover command is used to instruct a terminal device to perform satellite handover from a coverage of the first satellite network to a coverage of the second satellite network; the first handover command is used to determine at least some of first parameters; and the first parameter is used by the terminal device to perform first synchronization with the second satellite network before the satellite handover is performed.

Optionally, the first parameter is determined based on at least one of location information of the terminal device, configuration information of the second satellite network used for the satellite handover, or ephemeris information of a second satellite.

Optionally, the first handover command is an RACH-less handover command.

Optionally, handover indicated by the first handover command is first handover; the network device 1100 supports backoff from first handover to second handover; and second handover is performed based on an RACH.

Optionally, second handover is performed in a case that a quantity of failures of first handover is greater than a first threshold.

Optionally, the first synchronization includes uplink synchronization and/or downlink synchronization.

Figure 12:
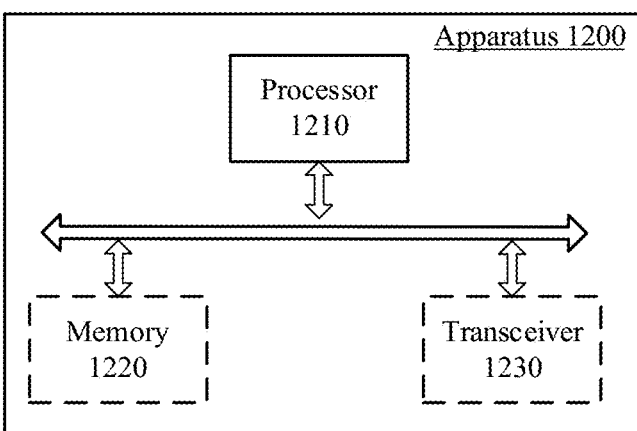
FIG. 12 is a schematic structural diagram of a communications apparatus according to an embodiment of the present application.

FIG. 12 is a schematic structural diagram of a communications apparatus according to an embodiment of the present application. The dashed lines in FIG. 12 indicate that the units or modules are optional. The apparatus 1200 may be configured to implement the method described in the foregoing method embodiments. The apparatus 1200 may be a chip, a terminal device, or a network device.

The apparatus 1200 may include one or more processors 1210. The processor 1210 may support the apparatus 1200 in implementing the method described in the foregoing method embodiments. The processor 1210 may be a general-purpose processor or a dedicated processor. For example, the processor may be a central processing unit (central processing unit, CPU). Alternatively, the processor may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 1200 may further include one or more memories 1220. The memory 1220 stores a program that may be executed by the processor 1210 to cause the processor 1210 to perform the method described in the foregoing method embodiments. The memory 1220 may be separate from the processor 1210 or may be integrated into the processor 1210.

The apparatus 1200 may further include a transceiver 1230. The processor 1210 may communicate with another device or chip by using the transceiver 1230. For example, the processor 1210 may transmit data to and receive data from another device or chip through the transceiver 1230.

An embodiment of the present application further provides a computer-readable storage medium for storing a program. The computer-readable storage medium may be applied to the terminal device or the network device provided in embodiments of the present application, and the program causes a computer to execute the methods to be executed by the terminal device or the network device in various embodiments of the present application.

The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state disk (solid state disk, SSD)), or the like.

An embodiment of the present application further provides a computer program product. The computer program product includes a program. The computer program product may be applied to the terminal device or the network device provided in embodiments of the present application, and the program causes a computer to execute the methods to be executed by the terminal or network device in various embodiments of the present application.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable device. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) manner or a wireless (for example, infrared, wireless, or microwave) manner.

An embodiment of the present application further provides a computer program. The computer program may be applied to the terminal device or the network device provided in embodiments of the present application, and the computer program causes a computer to perform the methods performed by the terminal or network device in various embodiments of the present application.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include", "have", and any variations thereof are intended to cover a non-exclusive inclusion.

In embodiments of the present application, "indicate" mentioned herein may refer to a direct indication, or may refer to an indirect indication, or may mean that there is an association relationship. For example, if A indicates B, it may mean that A directly indicates B, for example, B may be obtained from A. Alternatively, it may mean that A indirectly indicates B, for example, A indicates C, and B may be obtained from C. Alternatively, it may mean that there is an association relationship between A and B.

In embodiments of the present application, the term "corresponding" may mean that there is a direct or indirect correspondence between the two, or may mean that there is an association relationship between the two, which may also be a relationship such as indicating and being indicated, or configuring and being configured.

In embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, being pre-defined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, determining B based on A does not mean determining B based only on A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Units described as separate components may be or may not be physically separate, and components displayed as units may be or may not be physical units, and may be located in one position or distributed on a plurality of network units. Some or all of the units may be selected according to actual needs to achieve an objective of a solution in embodiments.

In addition, functional units in the embodiments of the present application may be integrated into one processing unit, each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for satellite handover between non-terrestrial networks, comprising:

receiving a first handover command, wherein the first handover command indicates a terminal device to perform satellite handover from a coverage of a first satellite network to a coverage of a second satellite network, wherein the first handover command is a random access channel (RACH)-less handover command, handover indicated by the first handover command is first handover, and the terminal device supports backoff from the first handover to second handover, and the second handover is performed based on an RACH, wherein the first handover command comprises a pre-allocated grant scheduled by the second satellite network, a time domain location of an uplink resource, and time-related parameter of the second satellite network; and performing first synchronization with the second satellite network based on a first parameter before the satellite handover is performed, wherein the first parameter is determined based on information in the first handover command, wherein the first parameter including at least one of:

a scheduling timing offset; or a round-trip time between a communications device and a reference point;

transmitting, by the terminal device, data to the second satellite network according to a timing determined based on the first parameter or according to the pre-allocated grant, wherein the data is transmitted to the second satellite network by using a timing advance (TA) that is same as a TA used to transmit to the first satellite network; and performing the second handover to the second satellite network by using the RACH according to the backoff.

2. The method according to claim 1, wherein after the receiving the first handover command and before the satellite handover is performed, the method further comprises:

determining a first scheduling offset based on the first parameter, wherein the first scheduling offset is used for the first synchronization.

3. The method according to claim 2, wherein the first scheduling offset is determined based on a second scheduling offset and a second parameter, wherein the second scheduling offset corresponds to the first satellite network; and the second parameter is a time difference caused by a distance between the first satellite network and the second satellite network.

4. The method according to claim 3, wherein the first scheduling offset is determined according to the following formula:

$$K_{offset2-temp} = K_{offset1} + (T2 - T1),$$

wherein $K_{offset2-temp}$ denotes the first scheduling offset; $K_{offset1}$ denotes the second scheduling offset; T2 denotes a reference time when the terminal device is handed over from the first satellite network to the second satellite network; and T1 denotes a current reference time of the first satellite network.

5. The method according to claim 1, wherein the method further comprises:

after the receiving the first handover command and before the satellite handover is performed, starting a first timer, wherein the first timer is configured to determine execution duration of the first synchronization.

6. The method according to claim 1, wherein the first synchronization is used to determine a third parameter used by the terminal device for the satellite handover; and the third parameter comprises one or more of the following parameters:

a first time point when the terminal device performs the satellite handover; or a first time domain location at which the terminal device performs uplink transmission to the second satellite network during the satellite handover.

7. The method according to claim 6, wherein the third parameter is determined based on one or more of the following pieces of information:

a first scheduling offset;

a third scheduling offset corresponding to the second satellite network;

a parameter of a first timer; or a first measurement result of measurement performed on the first satellite network by the terminal device.

8. The method according to claim 7, wherein the first measurement result indicates that the satellite handover is performed at a current instant; and the method further comprises at least one of the following:

determining the first time domain location based on the third scheduling offset;

determining the first time domain location based on the first scheduling offset and a difference between the first scheduling offset and the third scheduling offset; or determining the first time domain location based on the first scheduling offset.

9. The method according to claim 8, wherein the first time domain location is determined based on a second time domain location at which a TA command is received by the terminal device; and when the second time domain location is a slot n, the first scheduling offset $K_{offset2-temp}$ is less than the third scheduling offset $K_{offset2}$, and the first time domain location is a slot $n+k+1+2^{\mu}\cdot(K_{offset2-temp})+2^{\mu}\cdot(K_{offset2}-K_{offset2-temp})$; or the first scheduling offset $K_{offset2-temp}$ is greater than the third scheduling offset $K_{offset2}$, and the first time domain location is a slot $n+k+1+2^{\mu}\cdot(K_{offset2-temp})$, wherein $\mu$ is determined based on subcarrier spacing; and k is determined based on transmission response duration and a quantity of slots, wherein k, n, and $\mu$ are integers.

10. The method according to claim 7, wherein the first measurement result indicates that the satellite handover is not performed at a current instant; and the first time point is determined based on the first timer.

11. The method according to claim 1, wherein the first parameter is determined based on at least one of: location information of the terminal device, configuration information of the second satellite network used for the satellite handover, or ephemeris information of a second satellite.

12. The method according to claim 1, further comprising:

performing the second handover in response to that a quantity of failures of the first handover is greater than a first threshold.

13. The method according to claim 1, wherein the first synchronization comprises at least one of uplink synchronization or downlink synchronization.

14. A method for satellite handover between non-terrestrial networks, comprising:

transmitting a first handover command to a terminal device, wherein the first handover command instructs the terminal device to perform satellite handover from a coverage of a first satellite network to a coverage of a second satellite network, wherein the first handover command is a random access channel (RACH)-less handover command, handover indicated by the first handover command is first handover, and the terminal device supports backoff from the first handover to second handover, and the second handover is performed based on an RACH, wherein the first handover command comprises a pre-allocated grant scheduled by the second satellite network, a time domain location of an uplink resource, and time-related parameter of the second satellite network, and wherein a timing advance (TA) used to transmit to the second satellite network is same as a TA used to transmit to the first satellite network;

wherein the first handover command is used to determine a first parameter; and the first parameter is used by the terminal device for performing first synchronization with the second satellite network before the satellite handover is performed, wherein the first parameter including at least one of:

a scheduling timing offset; or a round-trip time between a communications device and a reference point.

15. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

receiving a first handover command, wherein the first handover command instructs a terminal device to perform satellite handover from a coverage of a first satellite network to a coverage of a second satellite network, wherein the first handover command is a random access channel (RACH)-less handover command, handover indicated by the first handover command is first handover, and the terminal device supports backoff from the first handover to second handover, and the second handover is performed based on an RACH, wherein the first handover command comprises a pre-allocated grant scheduled by the second satellite network, a time domain location of an uplink resource, and time-related parameter of the second satellite network; and performing first synchronization with the second satellite network based on a first parameter before the satellite handover is performed, wherein the first parameter is determined based on information in the first handover command, wherein the first parameter including at least one of:

a scheduling timing offset; or a round-trip time between a communications device and a reference point;

transmitting data to the second satellite network according to a timing determined based on the first parameter or according to the pre-allocated grant, wherein the data is transmitted to the second satellite network by using a timing advance (TA) that is same as a TA used to transmit to the first satellite network; and performing the second handover to the second satellite network by using the RACH according to the backoff.

16. The apparatus according to claim 15, wherein after the receiving the first handover command and before the satellite handover is performed, the operations further comprise:

determining a first scheduling offset based on the first parameter, wherein the first scheduling offset is used for the first synchronization.

17. The apparatus according to claim 16, wherein the first scheduling offset is determined based on a second scheduling offset and a second parameter, wherein the second scheduling offset corresponds to the first satellite network; and the second parameter is a time difference caused by a distance between the first satellite network and the second satellite network.

18. The apparatus according to claim 17, wherein the first scheduling offset is determined according to the following formula:

$$K_{offset2-temp} = K_{offset1} + (T2 - T1),$$

wherein $K_{offset2\text{-}temp}$ denotes the first scheduling offset; $K_{offset1}$ denotes the second scheduling offset; T2 denotes a reference time when the terminal device is handed over from the first satellite network to the second satellite network; and T1 denotes a current reference time of the first satellite network.

19. The apparatus according to claim 15, wherein the operations further comprise:

after the receiving the first handover command and before the satellite handover is performed, starting a first timer, wherein the first timer is configured to determine execution duration of the first synchronization.

20. The apparatus according to claim 15, wherein the first synchronization is used to determine a third parameter used by the terminal device for the satellite handover; and the third parameter comprises one or more of the following parameters:

a first time point when the terminal device performs the satellite handover; or a first time domain location at which the terminal device performs uplink transmission to the second satellite network during the satellite handover.

* * * * *